Oct. 28, 1958  C. J. BOCK  2,857,977
CAB-OVER-ENGINE TRUCK CAB
Filed Dec. 20, 1954  3 Sheets—Sheet 1

INVENTOR.
Carl J. Bock
BY
Paul Fitzpatrick
ATTORNEY

Oct. 28, 1958                 C. J. BOCK                 2,857,977
                       CAB-OVER-ENGINE TRUCK CAB
Filed Dec. 20, 1954                                3 Sheets-Sheet 3

INVENTOR.
Carl J. Bock
BY
Paul Fitzpatrick
ATTORNEY

United States Patent Office 2,857,977
Patented Oct. 28, 1958

2,857,977

CAB-OVER-ENGINE TRUCK CAB

Carl J. Bock, Birmingham, Mich., assignor to General Motors Corporation, Detroit, Mich., a corporation of Delaware Application December 20, 1954, Serial No. 476,245

7 Claims. (Cl. 180—89)

This invention relates to a vehicle body and more particularly to a cab-over-engine truck cab.

Cab-over-engine trucks offer several advantages over trucks having the engine forward of the cab body, but have a problem of accessibility of the engine for repairs, since the engine and associated drive mechanism are enclosed by the cab structure and located under the cab floor. To obtain access to the engine in present cab-over-engine trucks, the truck cab is either lifted bodily from the truck to expose the engine, or tilted forwardly and downwardly of the truck about a horizontal axis to expose the engine. Both are time-consuming and complicated maneuvers when it is merely desired to obtain access to the engine and associated drive mechanism for minor repairs.

This invention solves the problem of accessibility of the engine and associated drive mechanism for minor repairs by providing a cab-over-engine truck cab with access openings to the engine, easily movable closure panels for the openings, and a driver's seat which is pivotally and bodily movable from normal position wherein it is disposed over a portion of one of the openings to a raised position wherein it is out of the way of the closure panels and opening to provide a clear and unobstructed working space for the mechanic. For major repairs or replacement of the engine, the truck cab is lifted from the truck to expose the engine.

The primary object of this invention is to provide a cab-over-engine truck cab allowing easy accessibility to the engine. A more specific object of this invention is to provide a cab-over-engine truck cab with a pivotally and bodily movable seat to obtain access to the engine through openings located on the floor of the cab. A further specific object of this invention is to provide a cab-over-engine truck cab having openings in the cab floor to obtain access to the engine, closure panels for the openings, and a seat normally disposed over a portion of one of the openings and pivotally and bodily movable to a raised position to obtain access to the engine through the opening and closure panels.

These and other objects of this invention will be readily apparent from the following specification and drawings, in which.

Figure 1:
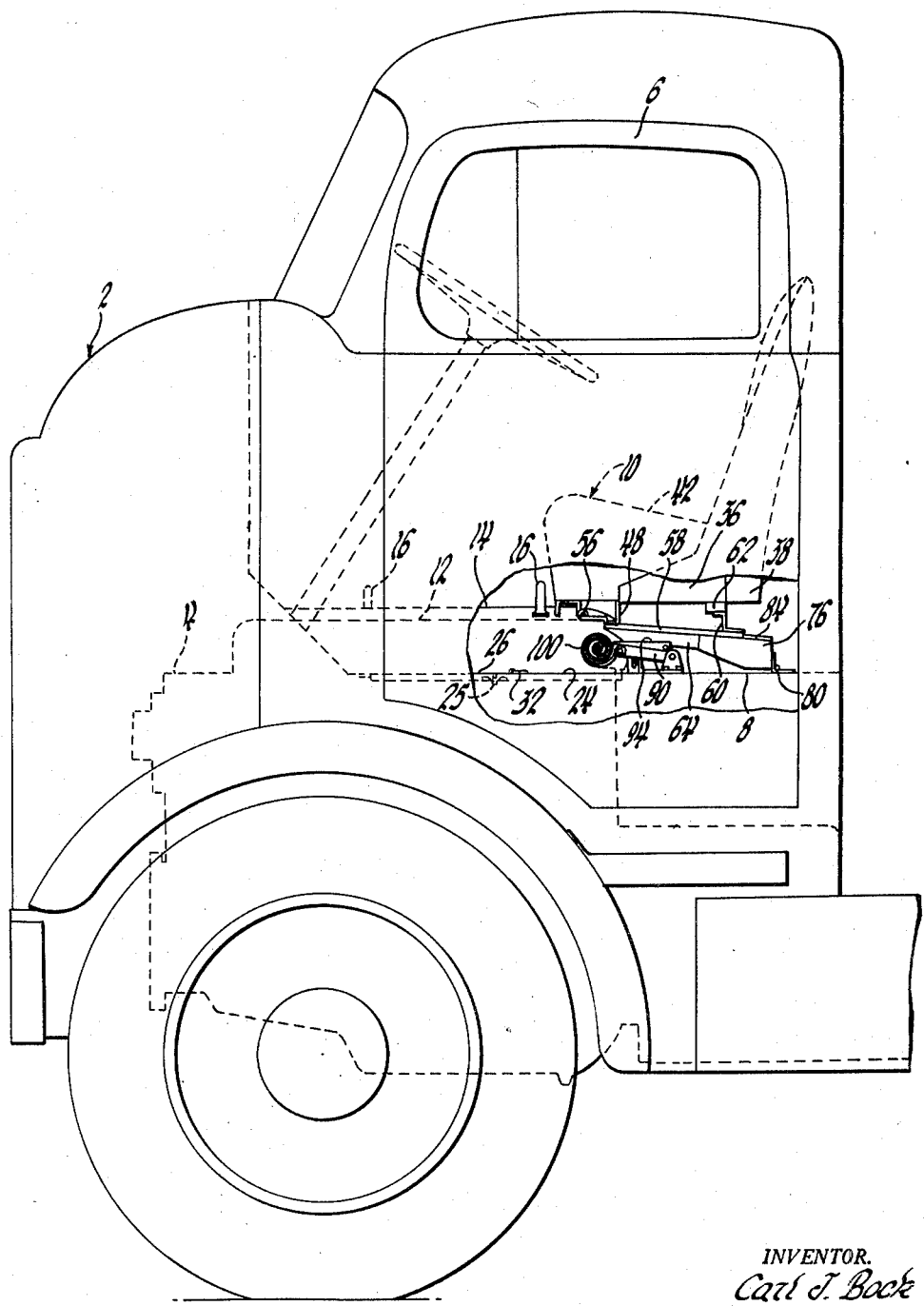
Figure 1 is an elevation view of a cab-over-engine truck cab embodying this invention with the seat in normal position and the closure panels within the access openings.

Referring now to Figure 1 of the drawings, a truck cab 2 supported by the vehicle chassis (not shown) encloses an engine 4 outlined in dash lines, supported by the vehicle chassis. The cab has doors 6 hinged at their forward edges to the body, and a floor 8 supporting a seat 10. The upper portion 12 of the engine projects through the cab floor and a cover 14 having handles 16 fits over this portion of the engine and seats against the cab floor.

Figure 2:
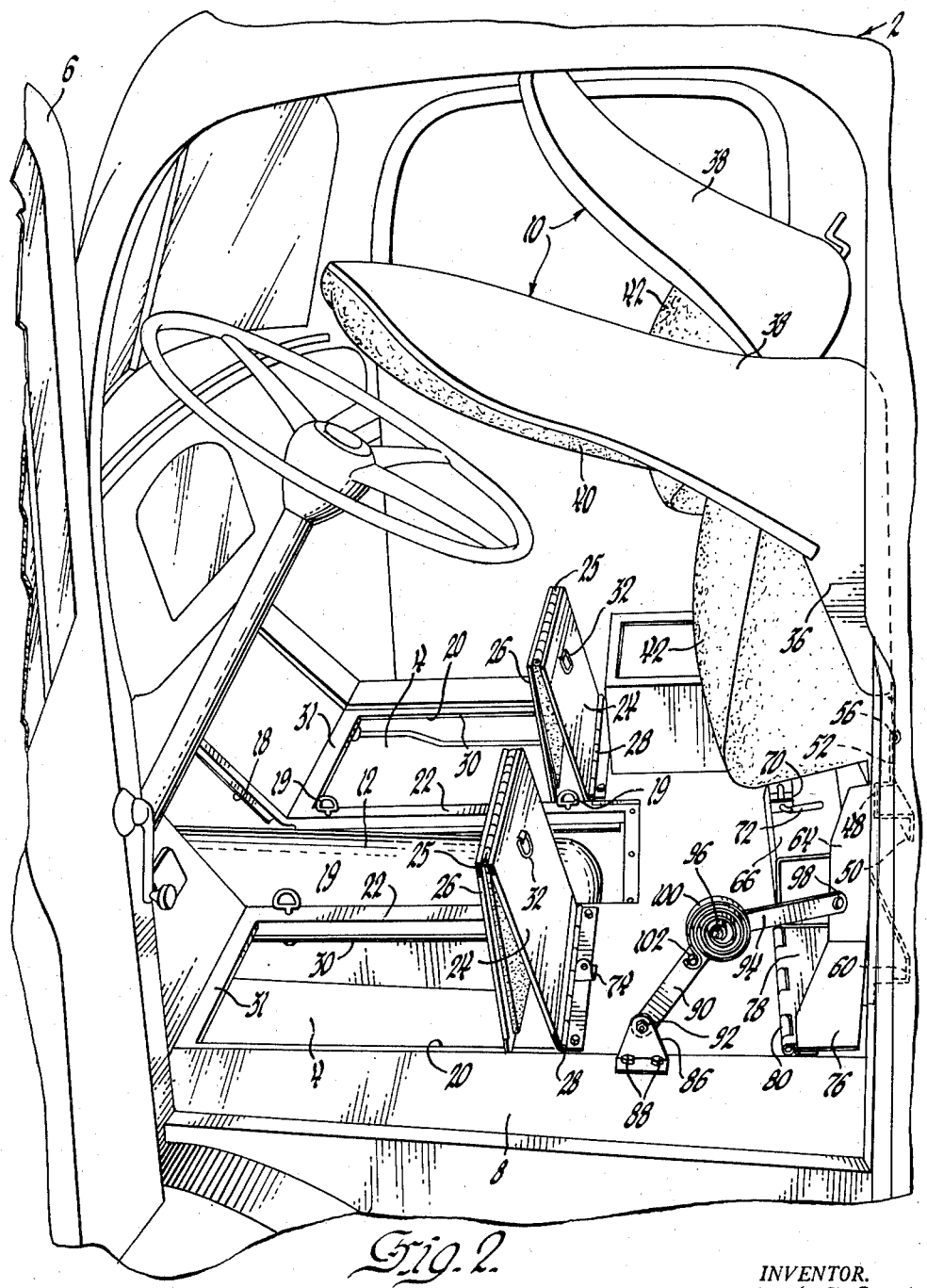
Figure 2 is a perspective view of the same with the seat in raised position and the closure panels in open position.
Figure 3:
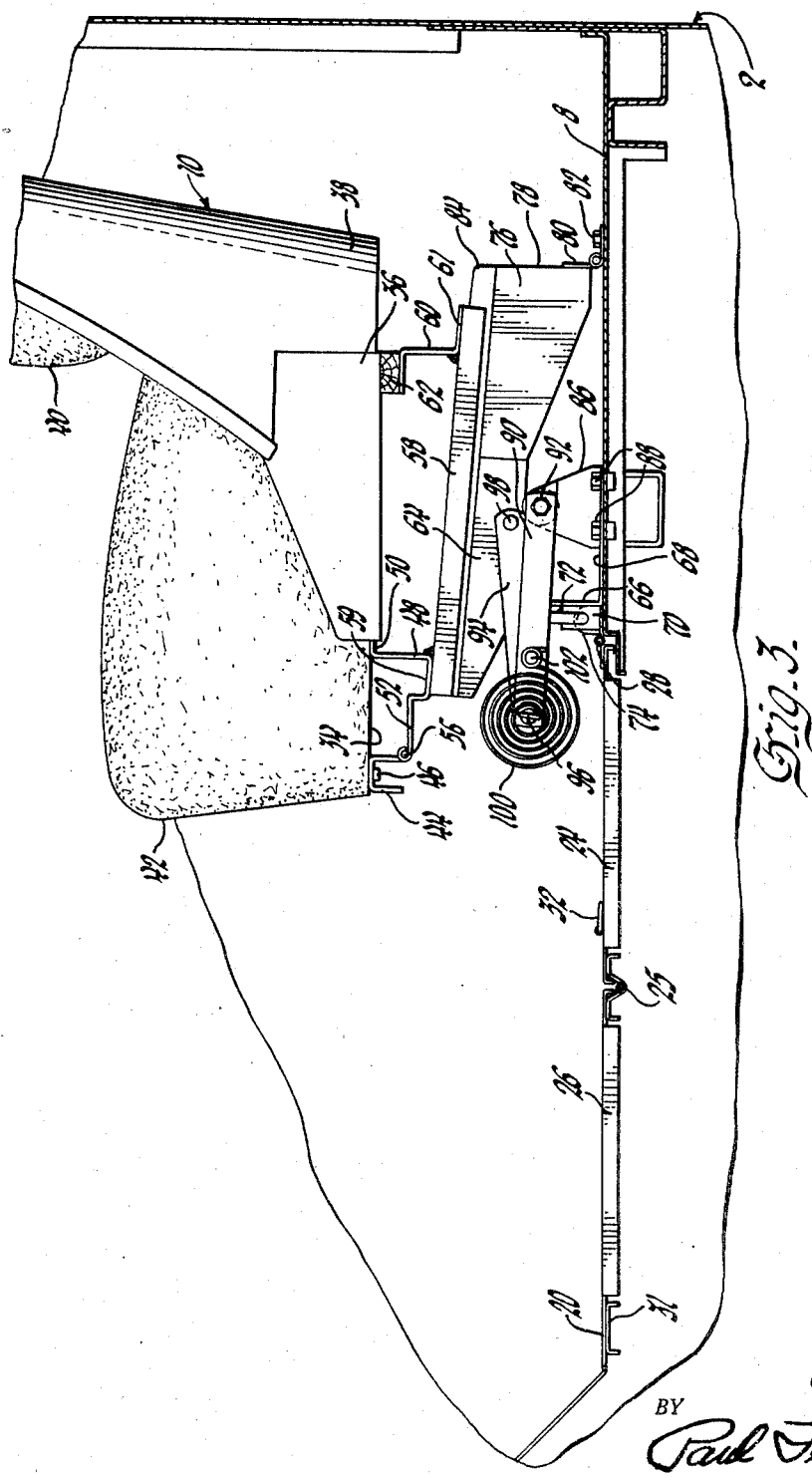
Figure 3 is an enlarged view of a portion of Figure 1 showing the seat in normal position and the closure panels within the access openings.

Referring now to Figures 2 and 3 of the drawings, the upper portion 12 of the engine projects through a longitudinal opening 18 in the cab floor and turnbolts 19 are provided along the sides of the opening to hold cover 14 in place. Openings 20 are provided on either side of the opening 18, and support rails 22 separate openings 20 from opening 18. Closure panels 24 and 26 pivotally interconnected at 25 fit within the openings 20 in their normal or closed position, and panels 24 are hinged to the rear edge of openings 20 at 28. The openings are provided with flanges 30 and 31 to support the panels in their closed positions and lift rings 32 are provided on panels 24 to enable the mechanic to lift the panels and fold them upwardly to gain access to the engine.

Figure 2 shows the raised position of the seat 10 and open position of the panels, and Figure 3 shows the closed position of the panels and the normal position of the seat. The seat includes a seat bottom frame 34, side frame 36, and back frame 38, a cushioned seat back 40, and a cushioned seat bottom 42. A channel 44 is bolted to the forward edge of the seat bottom frame 34 at 46 and a transversely extending channel 48, having flanges 50 and 52, is hinged to channel 44 at 56. A pair of horizontally spaced fore and aft extending upper seat adjuster channels 58 are welded to either end of channel 48 at 59, and a transverse bracket 60 welded to channels 58 at 61 supports a wood block 62 secured to the rear of the seat bottom frame 34. Seat 10 is thus supported by flange 50 of bracket 48 and bracket 60.

Referring now to Figure 2, a pair of side plates 64 are welded to either end of a transverse channel 66. The base 68 of this channel rests on the floor 8 in the normal position of the seat, Figure 3, and supports the forward ends of plates 64 which support the seat. An apertured bracket 70 is secured to the forward wall of the channel, and a spring biased locking rod 72 is mounted in the bracket. An apertured tab 74 secured to the floor of the cab receives the end of the locking rod in the normal position of the seat to hold the seat securely in this position. Plates 76 are welded to plates 64 and a back plate 78, Figure 2, is welded to both plates 64 and 76. A hinge 80 has one leaf welded to plate 78 and the other leaf bolted to floor 8 of the vehicle at 82. A pair of lower seat adjuster channels 84 are welded to the inner surface of plates 64, and provide a horizontal seat adjuster with channels 58 which fit over channels 84 and are spaced therefrom by suitable spacers such as balls or rollers according to usual practice. The horizontal position of the seat can be controlled by a suitable latch arrangement well known in the art.

Bracket 86 is bolted to the cab floor at 88 and link 90 is pivoted on the bracket at 92. A similar link 94 is pivoted on link 90 by pin 96 and to the outer side plate 64 at 98. A coil spring 100 has one end fitted within a slot in pin 96 which is fixed in link 94, and the other end hooked around a pin 102 fixed to link 90. The links and spring assist in raising the seat and hold the seat in its raised position.

Referring now to Figure 3 of the drawings, the forward portion of the seat extends over the rear portion of the opening 20 on the driver's side of the cab and prevents panels 24 and 26 from being folded upwardly to their open position. Therefore, in order to fold the panels and gain access to the engine, the seat must be pivotally and bodily moved from this position to its raised position shown in Figure 2. The seat pivots about its forward portion on the seat supporting structure, and this structure pivots about its rear portion on the cab floor to move the seat and supporting structure from normal to raised position. The operation of the seat is as follows: Locking rod 72 is withdrawn from tab 74 and the seat 10 is then titlted forwardly about hinge axis 56. After the seat has been titlted forwardly, it is then bodily lifted to its position shown in Figure 2. During this movement, the seat pivots about hinge axis 56, and the seat supporting structure pivots about the axis of hinge 80 until channel 44 rests against flange 50 of channel 48, and flange 50, bracket 60, and block 62 rest against the rear wall of the body. The coil spring 100 and the toggle links 90, 94 insure that the seat will remain in its raised position until it is manually lowered. Channel 44 of the seat bears against flange 52 of channel 48 to prevent the seat from dropping about hinge axis 56 and also urges the seat supporting structure to bear against the rear wall of the cab. After the seat has been moved to this position, closure panels 24 and 26 can be folded upwardly and the engine exposed.

Cover 14 for the upper portion 12 of the engine can be removed and replaced without moving seat 10. Although only one seat 10 is shown in the drawings, it is obvious that a similar seat can be provided on the passenger side of the truck to cooperate in the same manner with the closure panels 24 and 26 on the other side of the engine as shown in Figure 2.

Thus, this invention provides a truck cab including closure panels and a pivotally and bodily movable seat to allow access to the engine for minor repairs. The movement of the seat from its normal position to its raised position is very easy and requires only a few seconds. Thus, for minor repairs, a considerable amount of time is saved and no complicated maneuvers such as bodily lifting the truck cab from the truck or tilting the truck cab forwardly of the truck are required to expose the engine. As stated above, cover 14 may be removed without movement of the seat or closure panels. Thus, depending on the location of the repairs to the engine, either cover 14 or the closure panels on the driver's side or the passenger's side of the vehicle may be easily and quickly moved to allow access to the engine. For major repairs, the entire truck cab is bodily lifted from the truck to expose the engine.

Although a specific embodiment of this invention has been shown and described, various changes and modifications may be made within the scope and spirit of the invention.

I claim:

1. The combination comprising a vehicle chassis, a power plant supported by said chassis, a vehicle body supported by said chassis and enclosing said power plant, closure panels in the floor of said body movable to open position to obtain access to said power plant, unitary seat structure means within said body including a seat bottom portion normally disposed above said closure panels and a seat back portion supported by said seat bottom portion, and seat support means swingably mounted on said body adjacent said seat back portion and swingably secured to said seat bottom portion adjacent the forward end thereof for pivotal and bodily movement of said seat structure means to a position wherein said seat support means and said seat bottom portion are disposed in an aligned upright position to one side of said closure panels and said seat back portion is disposed in overlying relationship to said closure panels to allow movement of said panels to open position.

2. The combination comprising, a vehicle chassis, a power plant supported by said chassis, a vehicle body supported by said chassis and enclosing said power plant, closure panels in the floor of said body movable to open position to obtain access to said power plant, seat structure means within said body including a seat back portion and a seat bottom portion normally disposed above said closure panels and obstructing movement thereof to open position, seat support means normally disposed beneath said seat bottom portion in overlying relationship with said panels and being pivotally secured adjacent one end thereof to said body to one side of said closure panels, and means pivotally securing said seat support means adjacent the other end thereof to said seat bottom portion whereby said seat support means is disposed in foldable relationship thereto, said seat support means and said seat bottom portion being swingable relative to each other upon swinging movement of said seat support means relative to said body to dispose said seat bottom portion and said seat support means in a generally upright aligned position to said one side of said closure panels and to dispose said seat back portion in an overlying position with respect to said closure panels to allow movement thereof to open position.

3. The combination comprising, a vehicle chassis, a power plant supported by said chassis, a vehicle body supported by said chassis and enclosing said power plant, closure panels in the floor of said body movable to open position to obtain access to said power plant, seat structure means within said body including a seat back portion and a seat bottom portion normally disposed above said closure panels and preventing movement thereof to open position, seat support means pivotally interconnecting said seat structure means and said body and being normally disposed beneath said seat bottom portion in folded relationship thereto and to said floor, said seat bottom portion being swingable relative to said seat support means upon swinging movement of said seat support means relative to said floor to dispose said seat bottom portion and said seat support means in a generally unfolded position to one side of said closure panels and to dispose said seat back portion in an overlying position with respect to said closure panels to allow movement thereof to open position.

4. The combination comprising, a vehicle chassis, a power plant supported by said chassis, a vehicle body supported by said chassis and enclosing said power plant, closure panels in the floor of said body movable to open position to obtain access to said power plant, seat structure means within said body including a seat back portion and a seat bottom portion normally disposed above said closure panels and obstructing movement thereof to open position, seat support means normally disposed beneath said seat bottom portion in overlying relationship with said panels and being pivotally secured at one end thereof to said body to one side of said closure panels, means pivotally securing said seat support means adjacent the other side thereof to said seat bottom portion whereby said seat support means is disposed in foldable relationship thereto, said seat support means and said seat bottom portion being swingable relative to each other upon swinging movement of said seat support means relative to said body to dispose said seat bottom portion and said seat support means in a generally upright aligned position in engagement with the rear wall of said body to said one side of said closure panels and to dispose said seat back portion in an overlying position with respect to said closure panels to allow movement thereof to open position, and means for retaining said seat bottom portion and said seat support means in said upright aligned position thereof.

5. The combination comprising a vehicle chassis, a power plant supported by said chassis, a vehicle body supported by said chassis and enclosing said power plant, closure panels in the floor of said body movable to open position to obtain access to said power plant, unitary seat structure means within said body including a seat bottom portion normally disposed above said closure panels and a seat back portion supported by said seat bottom portion, and seat support means swingably mounted on said floor to one side of said closure panels adjacent said seat back portion and swingably secured to said seat bottom portion adjacent the forward end thereof for pivotal and bodily movement of said seat structure means to a position wherein said seat support means and said seat bottom portion are disposed in an aligned upright position to said one side of said closure panels and said seat back portion is disposed in overlying relationship to said closure panels to allow movement of said panels to open position.

6. The combination comprising a vehicle chassis, a power plant supported by said chassis, a vehicle body supported by said chassis and enclosing said power plant, closure panels in the floor of said body movable to open position to obtain access to said power plant, unitary seat structure means within said body including a seat bottom portion normally disposed above said closure panels and a seat back portion supported by said seat bottom portion, seat support means swingably mounted on said body adjacent said seat back portion and swingably secured to said seat bottom portion adjacent the forward end thereof for pivotal and bodily movement of said seat structure means to a position wherein said seat support means and said seat bottom portion are disposed in an aligned upright position to one side of said closure panels and said seat back portion is disposed in overlying relationship to said closure panels to allow movement of said panels to open position, and means biasing said seat support means to said upright position thereof to retain said seat support means and said seat bottom portion in said aligned upright position.

7. The combination comprising a vehicle chassis, a power plant supported by said chassis, a vehicle body supported by said chassis and enclosing said power plant, closure panels in the floor of said body movable to open position to obtain access to said power plant, unitary seat structure means within said body including a seat bottom portion normally disposed above said closure panels and a seat back portion supported by said seat bottom portion, seat support means swingably mounted on said body adjacent said seat back portion and swingably secured to said seat bottom portion adjacent the forward end thereof for pivotal and bodily movement of said seat structure means to a position wherein said seat support means and said seat bottom portion are disposed in an aligned upright position to one side of said closure panels and said seat back portion is disposed in overlying relationship to said closure panels to allow movement of said panels to open position, counterbalancing means biasing said seat support means to said upright position thereof, and latch means for retaining said seat structure means in the normal position thereof against the action of said counterbalancing means.

References Cited in the file of this patent

UNITED STATES PATENTS

| 1,427,280 | Gahm | Aug. 29, 1922 |
| 1,471,001 | Nicholson | Oct. 16, 1923 |
| 2,064,100 | Bachman | Dec. 15, 1936 |
| 2,360,805 | Thoma | Oct. 17, 1944 |
| 2,565,666 | Schaefer | Aug. 28, 1951 |

FOREIGN PATENTS

| 288,551 | Germany | Nov. 23, 1915 |